Nov. 8, 1932.   J. A. BUTTRESS   1,887,009
INTERNAL GRIPPING DEVICE
Filed Aug. 3, 1931   2 Sheets-Sheet 1
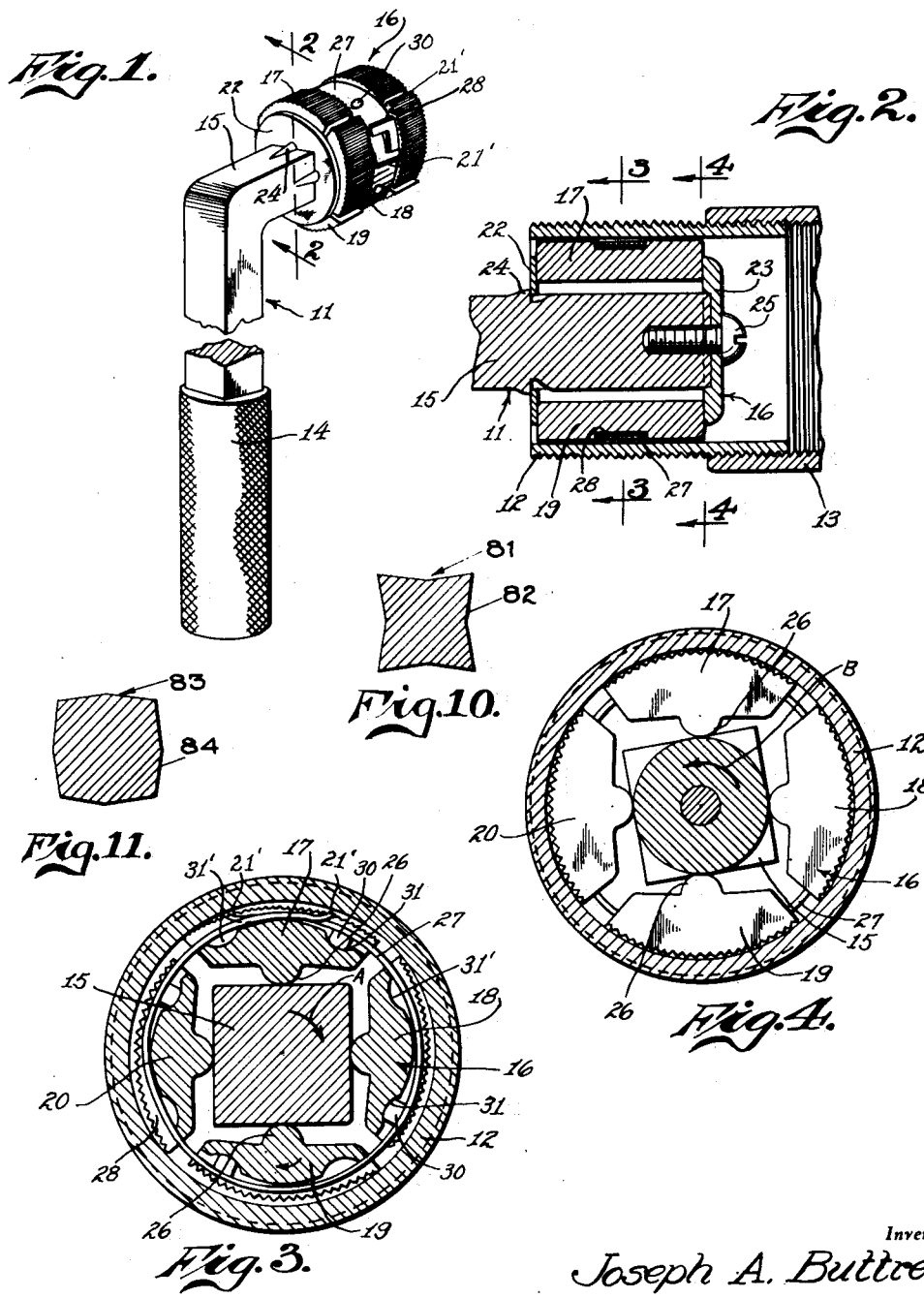
Inventor
Joseph A. Buttress,
By [signature]
Attorney Nov. 8, 1932. J. A. BUTTRESS 1,887,009
INTERNAL GRIPPING DEVICE
Filed Aug. 3, 1931 2 Sheets-Sheet 2
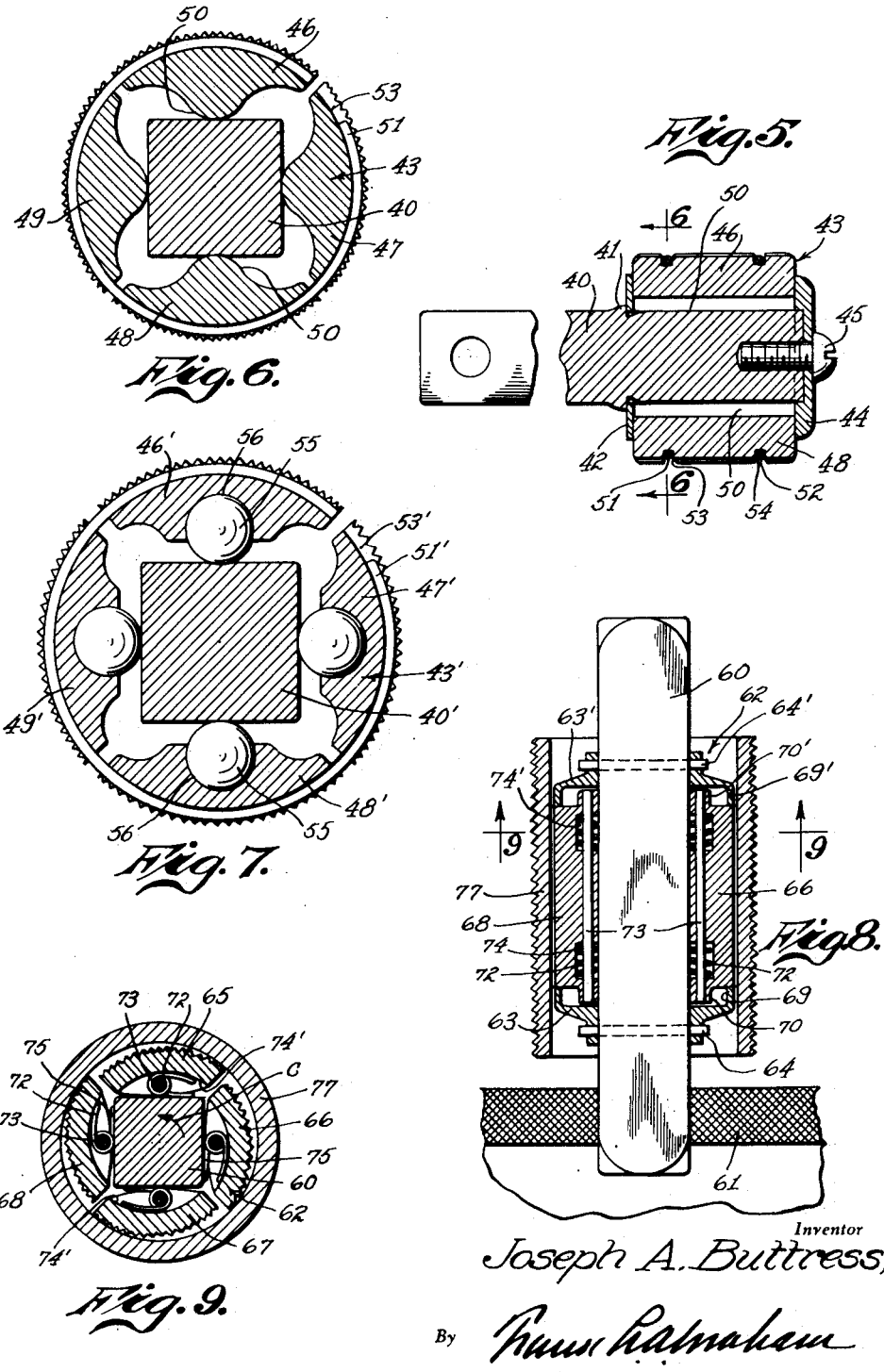
Inventor
Joseph A. Buttress,
By
Attorney Patented Nov. 8, 1932

1,887,009

UNITED STATES PATENT OFFICE

JOSEPH A. BUTTRESS, OF SOUTH PASADENA, CALIFORNIA, ASSIGNOR OF ONE-HALF TO GEORGE PARKER, OF JACKSON, MISSISSIPPI

INTERNAL GRIPPING DEVICE

Application filed August 3, 1931. Serial No. 554,667.

This invention has to do in a general way with tools for handling pipe and pipe fittings, and is more particularly related to tools of the general character, described in my co-pending application, Serial No. 548,120, filed July 1, 1931, which are especially designed for use in handling pipe or tubular members which cannot conveniently be engaged by the usual type of external pipe wrench.

The tool contemplated by this invention is, like the one described in my co-pending application mentioned above, an internally expanding tool, and is particularly applicable to use in connection with short nipples where an external wrench would mar the threads, fittings for sinks, laundry tubs, and the like, which cannot be engaged by an external wrench, and also in pipes of various kinds where the pipes have become so worn or broken close to a fitting that an external wrench cannot be used.

My invention is also adapted for use in connection with plated pipes where an external wrench would mar the finish, and with thin walled pipes which would be bent or crushed by the unsual type of external wrench.

The tool contemplated by this invention consists in a general way of a mandrel which is polygonal in cross section, the faces thereof being either flat, concave, or convex, and is associated with an expanding body member adapted to be moved both radially and angularly during the rotation of the mandrel. It is an important feature of this construction that the rotating polygonal mandrel effects an expansion of the body which is uniformly equalized throughout its length. In other words, both radial pressure and torque are uniformly applied to the engaged surface of a tube throughout the entire length of the wrench body.

The body member is made up of a plurality of segments which I have termed "rockers," such rockers being formed and arranged so that the assembled body member is substantially cylindrical in shape. The number of rockers corresponds to the number of faces on the mandrel so that there is one rocker for each face, and each rocker has a bearing member engaging its corresponding face. The rotation of the mandrel therefore tends to impart both a radial and angular thrust to each rocker, and where the body member is inserted into the interior of a tubular member, such as a pipe, this thrust is in turn imparted to the inner wall of the pipe.

Means are provided for holding the various rockers in assembled relation upon the body member.

In a preferred form of my invention I construct the body member so that it is unidirectional in its action. In other words, the body member has a gripping action upon the pipe in one direction only, and consequently may be used with a ratcheting effect, which is extremely desirable in many circumstances under which the tool may be used. For example, the tool contemplated by this invention, besides being extremely useful as a wrench, as pointed out above, may be embodied in a tool for holding short nipples while they are being threaded with a die, or in a clutch or ratchet for use in a machine. When a short nipple is being threaded the ratchet type of tool is extremely handy since the nipple is ordinarily gripped vertically in a vise, where it is unhandy for the workman to revolve the stock carrying the die through a complete circle over the work bench.

The device contemplated by this invention is of simple form and construction; it may be economically manufactured; and contains no parts subject to excessive wear.

The details of the construction of certain preferred forms of my invention, together with other objects attending its production, will be best understood from the following description of the accompanying drawings, which are chosen for illustrative purposes only, and in which—

Fig. 1 is a perspective view showing a preferred form of my invention embodied in a wrench;

Fig. 2 is a fragmentary sectional elevation taken in a plane represented by the line 2—2 in Fig. 1;

Fig. 3 is a sectional view taken in a plane represented by the line 3—3 in Fig. 2 showing the rockers arranged for ratcheting action;

Fig. 4 is a sectional view taken in a plane represented by the line 4—4 in Fig. 2 showing the body expanded into pressure engagement with the pipe;

Fig. 5 is a sectional elevation illustrating the details in the construction of another form of my invention;

Fig. 6 is a sectional view taken in the plane represented by the line 6—6 of Fig. 5;

Fig. 7 is a sectional view similar to Fig. 6, but showing another form of my invention;

Fig. 8 is a sectional elevation illustrating a modified form of my invention which is arranged for use in connection with a stock and die for threading a short nipple;

Fig. 9 is an inverted plan view taken in a plane represented by the line 9—9 of Fig. 8; and Figs. 10 and 11 are sectional views showing modified forms of mandrel construction.

More particularly describing the invention as herein illustrated, reference numeral 11 indicates a wrench which is illustrated in Figs. 2, 3, and 4 as being in engagement with the interior of a short nipple 12 which, in turn, may be threaded in a collar 13.

The wrench 11 is illustrated as comprising a handle 14, the upper end portion of which is bent at substantially right angles into what I may term a mandrel or mandrel member 15. The mandrel 15 forms the support and actuating member for a body 16. It will be observed that the mandrel 15 is substantially square in cross section, but it is to be understood that within certain limits a mandrel of any polygonal cross section may be employed to accomplish the purpose of this invention, also as pointed out above the faces of the mandrel may be concave or convex instead of flat.

As indicated in the fore part of the specification, the body member 16 consists of a plurality of rockers 17, 18, 19, and 20, corresponding to the number of faces on the mandrel 15. Each of the rockers is provided with a curved and preferably knurled external surface, so that all the rockers cooperate when assembled upon the mandrel and inserted in a pipe or tubing to form a substantially cylindrical body. In this form of my invention the body member 16, formed of the rockers described above, is held against longitudinal movement upon the mandrel by means of washers 22 and 23, the former being engaged by projections 24 formed on the mandrel and the latter being held on the mandrel by means of a screw 25. The rockers forming the body are each provided with a bearing member indicated at 26, such members being adapted to engage the faces of the mandrel corresponding to the respective rockers, and the rockers are yieldably held against unlimited radial movement relative to the mandrel by means of a circular spring 27 which is shown as being received in an annular groove or grooves 28.

It was pointed out in the fore part of the specification as a noteworthy feature of a preferred form of my invention that the body member was constructed so as to be unidirectional in its action with respect to the interior of a tube or pipe in connection with which it was being used. In other words, I consider it an important feature of this form of my invention that the tool or wrench is adapted for ratcheting action during its use. This feature is accomplished by constructing the various rockers and the spring 27 associated therewith so that all the rockers are tilted or cocked in one direction. In this form of my invention this tilting or cocking action is accomplished by providing the spring 27 with a series of inwardly extending projections or buttons 30 arranged so as to be received in recesses 31 provided in corresponding sides of all the rockers. In this connection it is important to note that the length of the buttons 30 and the formation of the grooves receiving the springs are such that the side of the rocker opposite the portion engaged by the button is tilted up into engagement with the spring. Thus any loose engagement between these members is prevented. This is accomplished by cutting the grooves in the rockers on the segment of an elipse or oval whereas the spring is substantially circular in form. In other words, the grooves in the rockers are cut so that they are deeper at their end portions than they are at the outer.

The ratcheting feature is clearly illustrated in Fig. 3 where it will be observed that the buttons 30 tilt the rockers so that the complete unit may be rotated in the general direction of the arrow "A", and under such circumstances the rear edge only of each rocker engages the interior of the pipe or tubular member containing the wrench body. When the mandrel is rotated in the reverse direction, as indicated by the arrow B in Fig. 4, the corners of the rockers, which, under the circumstances, become the leading edges, engage the interior of the pipe or tubing and are held against movement relative to the pipe which results in the mandrel 15 being rotated relative to the rockers. Consequently, the torque applied to the handle 14 is transmitted to the various rockers comprising the body member as a combination of radial and angular thrusts, since the tendency of the mandrel to move relatively to the various rockers results in a radial force pressing the rockers into firm engagement with the interior of the pipe, and the continued torque is transmitted to the pipe as an angular force or thrust.

With the parts arranged as shown in Figs. 3 and 4 the wrench is adapted for use in removing a right-hand threaded pipe or nipple from its associated collar. In order to use the tool for installing the same pipe or nipple, the body member may be removed and reversed, or the spring member 27 may be shifted from the position shown in Fig. 3 to a position in which the buttons or projections 30 are received in the recess or notch 31' situated on the opposite side of the bearing members in the various rockers. Through this latter procedure the rockers are cocked or tilted in the reverse direction from that shown in Fig. 3, and the wrench may therefore be used to operate in the opposite manner from that just described. To facilitate this adjustment, the end portions of the spring 27 are provided with offset notches so that they overlap and the extreme ends are turned up as indicated at 21' to provide means for gripping and expanding the spring while it is being turned relative to the body.

In the form of my invention shown in Figs. 5 to 7 inclusive, I disclose a tool based upon the same mechanical principles of operation as the tool just described, but differing from the other form of my invention in that this particular tool is adapted for use in both directions and does not embody the ratching feature discussed above. In this form of my invention the mandrel 40 is shown as being in the form of a straight shank which may be of any desired length such that it can be inserted a substantial distance into the interior of a long pipe, it being understood, of course, that the same type of handle shown in Fig. 1 may be used on this tool and vice versa.

The mandrel shown in Figs. 5 and 6 is square in cross section, similar to the mandrel shown in Fig. 1 and is provided with upturned projections 41 adapted to engage a washer 42 for holding the body member 43 against inward longitudinal movement; the outward longitudinal movement of the body member being prevented by a washer 44 which is held upon the mandrel by a screw 45.

The body member 43 is like the body member 16 comprised of a plurality of segments or rockers 46, 47, 48, and 49, each rocker being formed with a bearing portion 50 which engages its corresponding face on the mandrel.

It will be observed that the formation or construction of the individual rockers in this form of my invention differs somewhat from the construction of the rockers as shown in Figs. 3 and 4, in that where the inner faces of the rockers in Figs. 3 and 4 are substantially straight and form angles of substantially 90° with each other, the inner faces of the rockers in the body member shown in Fig. 6 are formed on curves so that the outline of the cross section through the space defined by the interior of the body member is in the nature of a Maltese cross. It will be understood, of course, that this type of rocker, as well as the type shown in Fig. 7, may be used in conjunction with the invention as described in connection with Fig. 1 and vice versa.

The major difference between the form of my invention shown in Figs. 6 and 7, and the form shown in Figs. 1 to 4 inclusive, resides in the yieldable means whereby the various rockers are held against unlimited radial movement relative to the mandrel.

In Fig. 6 I employ a pair of wire springs 51 and 52 which are received in grooves 53 and 54. It will be observed that these springs are not provided with means for tilting or cocking the various rockers so that this type of head may be rotated in either direction and will be brought into positive engagement with the interior of a pipe or tubing in connection with which the wrench is being operated.

The form of my invention shown in Fig. 7 is substantially the same as the form shown in Fig. 6, and the parts therein are indicated by the same reference numerals distinguished by the prime mark. The only material distinction between these two forms of my invention is that the bearing members in the form shown in Fig. 7 are in the nature of rollers 55 received in recesses 56 formed in the various rockers.

The form of my invention shown in Figs. 8 and 9 is similar in function to the form described in connection with Figs. 1 to 4 inclusive in that the body members in these forms of the invention are adapted to have a ratcheting action relative to the mandrel. In Fig. 8 I show the invention as embodying a short mandrel 60 which is shown as being secured in the jaws of a vise 61; this construction being particularly suited to the threading of the short nipples. In this particular form of my invention the body member 62 is mounted on the mid-portion of the mandrel 60 and is held thereon by means of collars 63 and 63' which are secured to the mandrel through the medium of pins 64 and 64'.

The working elements of the body member 62 comprise rockers 65, 66, 67, and 68. These rockers are held against longitudinal movement by means of the collars 63 and 63' and their radial movement is limited by means of inwardly projecting flanges or shoulders 69 and 69' on the collars, which are adapted to engage end projections 70 and 70' on the various rockers. The rockers 65 to 68 inclusive have their inner portions tapered or sloped inwardly so as to form bearing surfaces adapted to engage the corresponding faces of the mandrel. As pointed out above, this tool, like the one described in connection with Fig. 1 is adapted to have a ratcheting action. I produce this action by providing each segment with an individual spring member of the hair pin type, which is adapted to tilt or cock the successive segments in the same general direction. These spring members are indicated generally by reference numeral 72 and are shown as being mounted upon pins 73 which extend through the respective rockers. Each rocker is provided at its opposite end portions with notches 74 and 74', the notches being adapted to receive the coiled end portions of the springs 72. The projecting or hair pin portions 75 of the springs 72 are adapted to engage the respective faces of the mandrel 60, and through such engagement are adapted to tilt or cock the various rockers, as indicated in Fig. 9.

It will be observed from Fig. 9 that if the mandrel 60 is rotated in the general direction of the arrow "C", or if the pipe is rotated in the opposite direction, the mandrel being held stationary, that the rockers will move relative to the tubing or nipple 77, and if rotated in the opposite direction the rockers will be forced into pressure engagement with the tubing. In other words, in the arrangement shown in Fig. 8, assuming that the nipple is being threaded or rethreaded, the stock and die may be rotated through, say one quarter of a turn, the tool holding the nipple stationary and then during a return rotation of the stock and die, the nipple and the die are permitted to turn together with respect to the supporting body member.

It will be understood, of course, that the form of my invention shown in Figs. 1 to 4 inclusive may be modified for use in this same connection, and it will also be apparent that if it is desired to reverse the operation of the tool as shown in Figs. 8 and 9, it is only necessary to invert the tool so that where the tool formerly was idle or did not grip the pipe during a counterclockwise rotation, it is made effective to hold the pipe against rotation during said counterclockwise movement.

It will also be apparent that the form shown in Figs. 5 to 7 inclusive may be incorporated in a device of this character, it being understood, of course, that this latter type of tool will not have the function of ratcheting or permitting a gripping action during rotation in one direction only.

It was pointed out in the early part of the specification that the mandrel might be provided with concave or convex faces instead of flat faces. Mandrels of these types are shown in Figs. 10 and 11, when the mandrel 81 is provided with concave faces 82 and the mandrel 83 is provided with convex faces 84. It will be observed that the mandrel 81, when used in conjunction with suitable rockers such as are shown in Fig. 1, etc., will move the rockers out radially at a greater speed than either a flat-faced mandrel or a mandrel of the convex type, as shown at 83. The mandrel 83, however, while slower in action, gives a greater leverage or purchase in its action and may be preferred to the other two forms under certain circumstances.

It will be apparent from the foregoing description that the tool contemplated by this invention may be made adjustable for different sizes of pipe merely by mounting the body on a tapered mandrel. A device of this character may include suitable means for locking the body at any desired position on the mandrel, but in any event it is obvious that such a device may be set for expansion to various diameters merely by shifting the position of the body on the mandrel.

It will also be apparent that the device contemplated by this invention is adapted for numerous uses aside from those discussed above; for example, this device may be embodied in a clutch or the forms shown in Figs. 1 and 8 may be used as the ratcheting element in any machine requiring an element of this character. This latter use has an enhanced value, since by providing the elements with suitable fibre lining, I am able to produce a ratchet which is both silent and positive in its operation.

It is to be understood, therefore, that while I have herein described and illustrated certain preferred forms of my invention and indicated certain preferred uses thereof, that the invention is not limited to the precise construction or uses described above, but includes within its scope whatever changes fairly come within the spirit of the appended claims.

I claim as my invention:

1. An expanding tool embodying: a mandrel of polygonal cross-section; and a radially expanding body mounted on said mandrel, said body comprising a plurality of rockers corresponding to the number of faces on said mandrel, each rocker having a bearing member which projects inwardly from an intermediate portion of said roller and engages a corresponding mandrel face, the outer faces of said rockers being formed so that they cooperate to provide a substantially cylindrical engaging surface.

2. An expanding tool embodying: a mandrel of polygonal cross-section; a radially expanding body mounted on said mandrel, said body comprising a plurality of rockers corresponding to the number of faces on said mandrel, each rocker having a bearing member which projects inwardly from an intermediate portion of said roller and engages a corresponding mandrel face; and spring means for yieldably holding said rockers against radial movement, the outer faces of said rockers being formed so that they cooperate to provide a substantially cylindrical engaging surface.

3. An expanding tool embodying: a mandrel of polygonal cross-section; a radially expanding body mounted on said mandrel, said body comprising a plurality of rockers corresponding to the number of faces on said mandrel, each rocker having a bearing member which projects inwardly from an intermediate portion of said roller and engages a corresponding mandrel face; and means for holding said body member against longitudinal movement on said mandrel, the outer faces of said rockers being formed so that they cooperate to provide a substantially cylindrical engaging surface.

4. An expanding tool embodying: a mandrel of polygonal cross-section; a radially expanding body mounted on said mandrel, said body comprising a plurality of rockers corresponding to the number of faces on said mandrel, each rocker having a bearing member which projects inwardly from an intermediate portion of said roller and engages a corresponding mandrel face; and spring means for yieldably holding said rockers against radial movement; and means for holding said body member against longitudinal movement on said mandrel, the outer faces of said rockers being formed so that they cooperate to provide a substantially cylindrical engaging surface.

5. An expanding tool embodying: a mandrel of polygonal cross-section; a radially expanding body mounted on said mandrel, said body comprising a plurality of rockers corresponding to the number of faces on said mandrel, each rocker having a bearing member which projects inwardly from an intermediate portion of said roller and engages a corresponding mandrel face; and means for holding said rockers in assembled relation on said mandrel, the outer faces of said rockers being formed so that they cooperate to provide a substantially cylindrical engaging surface.

6. An expanding tool embodying: a mandrel of polygonal cross-section; a radially expanding body mounted on said mandrel, said body comprising a plurality of rockers corresponding to the number of faces on said mandrel, each rocker having a bearing member which projects inwardly from an intermediate portion of said roller and engages a corresponding mandrel face; means for holding said rockers in assembled relation on said mandrel; and means for holding said expanding body against longitudinal movement on said mandrel, the outer faces of said rockers being formed so that they cooperate to provide a substantially cylindrical engaging surface.

7. An expanding tool embodying: a mandrel of polygonal cross-section; a radially expanding body mounted on said mandrel, said body comprising a plurality of rockers corresponding to the number of faces on said mandrel, each rocker having a bearing member engaging the corresponding mandrel face; means for holding said rockers against radial movement; and means for yieldably tilting said rockers relative to said mandrel faces.

8. An expanding tool embodying: a mandrel of polygonal cross-section; and a radially expanding body mounted on said mandrel comprising a plurality of rockers corresponding to the number of faces on said mandrel; a rib on each rocker engaging the corresponding mandrel face so that said rockers may tilt relative to the corresponding mandrel faces; yieldable means for limiting the radial movement of said rockers; and means for holding said rockers against longitudinal movement.

9. An expanding tool embodying: a mandrel of polygonal cross-section; a radially expanding body mounted on said mandrel, said body comprising a plurality of rockers corresponding to the number of faces on said mandrel, each rocker having a bearing member engaging its corresponding mandrel face; a spring ring engaging said rockers for yieldably holding them against radial movement on said mandrel; and projections on the under surface of said spring ring for tilting said rockers relative to said mandrel.

10. An expanding tool embodying: a mandrel of polygonal cross-section; a radially expanding body mounted on said mandrel, said body comprising a plurality of rockers corresponding to the number of faces on said mandrel, each rocker having a bearing member engaging its corresponding mandrel face; a spring ring engaging said rockers for yieldably holding them against radial movement on said mandrel; projections on the under surface of said spring ring for tilting said rockers relative to said mandrel; and means for holding said body against longitudinal movement on said mandrel.

11. An expanding tool embodying: a mandrel of polygonal cross-section; a radially expanding body mounted on said mandrel, said body comprising a plurality of rockers corresponding to the number of faces on said mandrel, each rocker having a bearing member engaging its corresponding mandrel face; a spring ring engaging said rockers for yieldably holding them against radial movement on said mandrel; and projections on the under surface of said spring ring for tilting said rockers relative to said mandrel, said spring ring being angularly shiftable so as to vary the direction in which said rockers are tilted.

12. An expanding tool embodying: a mandrel of polygonal cross-section; an expanding body mounted on said mandrel, said body comprising a plurality of rockers corresponding to the number of faces on said mandrel; washer members secured to said mandrel and provided with means for limiting the radial movement of said rockers; and spring means associated with each rocker for tilting said rockers relative to said mandrel.

13. An expanding tool embodying: a mandrel of polygonal cross-section having concave faces; and a radially expanding body mounted on said mandrel, said body comprising a plurality of rockers corresponding to the number of faces on said mandrel, each rocker having a bearing member engaging the corresponding mandrel face.

14. An expanding tool embodying: a mandrel of polygonal cross-section having convex surfaces; and a radially expanding body mounted on said mandrel, said body comprising a plurality of rockers corresponding to the number of faces on said mandrel, each rocker having a bearing member engaging the corresponding mandrel face.

15. An expanding tool embodying: a mandrel of polygonal cross-section; and a radially expanding body mounted on said mandrel, said body comprising a plurality of rockers corresponding to the number of faces on said mandrel, a bearing member on each rocker engaging the corresponding mandrel face, and adjustable yieldable means for tilting said rockers relative to said mandrel in either direction.

16. An expanding tool embodying: a mandrel of polygonal cross-section; a radially expanding body mounted on said mandrel, said body comprising a plurality of rockers corresponding to the number of faces on said mandrel, each rocker having a bearing member engaging its corresponding mandrel face; a spring ring engaging said rockers for yieldably holding them against radial movement on said mandrel; and projections on the under surface of said spring ring for tilting said rockers relative to said mandrel, said rockers being provided with recesses on opposite sides of their central portion for optionally receiving one of said projections.

In testimony whereof, I have hereunto set my hand at Los Angeles, California, this 28th day of July, 1931.

JOSEPH A. BUTTRESS.